UNITED STATES PATENT OFFICE 2,210,942

MOTOR FUEL

David Lipkin, Berkeley, Calif., assignor to The Atlantic Refining Company, Philadelphia, Pa., a corporation of Pennsylvania No Drawing. Application October 20, 1936, Serial No. 106,569

1 Claim. (Cl. 44—9)

The present invention relates to motor fuels, and relates more particularly to motor fuels comprising branched-chain oxygenated organic compounds, and specifically aldehydes, esters and ketones containing at least one branched-chain, and/or hydrocarbon mixtures containing branched-chain aldehydes, esters or ketones.

A principal object of this invention is the improvement of the anti-detonation characteristics of hydrocarbon motor fuels by the addition thereto of one or more branched-chain aldehydes, esters or ketones.

A further object of this invention is the improvement in the blending value of hydrocarbon motor fuels with organo-metallic compounds such as tetraethyl lead, by the addition to such fuels of one or more branched-chain aldehydes, esters or ketones.

A further object of this invention is the improvement of the volatility of hydrocarbon motor fuels by the addition thereto of branched-chain aldehydes, esters or ketones, and particularly such compounds having a boiling point below about 125° C.

It has been known heretofore that volatile, straight-chain aldehydes, esters and ketones such as acetaldehyde, paraldehyde, acetone, methyl ethyl ketone, methyl acetate and ethyl butyrate are suitable for use in improving the volatility of hydrocarbon fuels such as gasoline, and such compounds have been employed particularly as constituents of aviation motor fuels.

I have found that aldehydes, esters and ketones having one or more branched-chains, are in themselves, suitable for use as motor fuels, and are of particular utility as addition agents for improving the anti-detonation characteristics, volatility and blending qualities of hydrocarbon motor fuels such as gasoline. The branched-chain aldehydes, esters and ketones which may be employed in accordance with my invention comprise essentially compounds having at least one primary, secondary or tertiary branched-chain aliphatic group and may be represented by the following formulae:

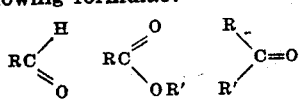

wherein either one or both R and R' are branched-chain aliphatic radicals. If only one is branched, the other may be any other radical such as aryl or straight-chain alkyl.

Branched-chain aldehydes, esters and ketones which may be employed as motor fuels or as addition agents for improving the qualities of hydrocarbon motor fuels, are exemplified by the following:

2-methyl pentanal-5,
$$CH_3.CH(CH_3).CH_2.CH_2.CHO$$
2-methyl propanal, $(CH_3)_2CH.CHO$
2-methyl butanal, $CH_3.CH_2.CH(CH_3).CHO$
3-methylpentanal, $CH_3.CH_2.CH(CH_3).CH_2CHO$
2,2-dimethyl propanal, $(CH_3)_3C.CHO$
2,2-dimethyl butanal, $CH_3.CH_2.C(CH_3)_2.CHO$
2,2,3-trimethyl butanal-4,
$$CH_3.C(CH_3)_2.CH(CH_3).CHO$$
2,2-dimethylbutyl-3 acetate,
$$(CH_3)_3.C.C.(CH_3).O.CO.CH_3$$
2,4-dimethylpentyl-3 trimethylacetate,
$$[(CH_3)_2.CH]_2.CH.O.CO.C(CH_3)_3$$
Tertiary butyl acetate, $CH_3.CO.OC.(CH_3)_3$
Ethyl trimethylacetate, $(CH_3)_3C.CO.OC_2H_5$
Isopropyl diethylmalonate,
$$(C_2H_5)_2.C.[CO.OCH(CH_3)_2]_2$$
Methyl tertiary butyl acetate,
$$(CH_3)_3C.CH_2.CO.OCH_3$$
Methyl isopropyl ketone, $CH_3.CO.CH(CH_3)_2$
Ethyl iso-propyl ketone, $CH_3.CH_2.CO.CH(CH_3)_2$
Methyl secondary-butyl ketone,
$$CH_3.CO.CH(CH_3).CH_2.CH_3$$
Methyl tertiary-butyl ketone, $CH_3.CO.C(CH_3)_3$
Diisopropyl ketone, $(CH_3)_2CH.CO.CH(CH_3)_2$
Pentamethyl acetone, $(CH_3)_3C.CO.CH(CH_3)_2$
2,2,5,5-tetramethylhexanone-3,
$$(CH_3)_3C.CO.CH_2.C(CH_3)_3$$
Hexamethylacetone, $(CH_3)_3C.CO.C(CH_3)_3$
Mesityl oxide, $CH_3.CO.CH=C(CH_3)_2$
Isopropyl phenyl ketone, $C_6H_5.CO.CH(CH_3)_2$ The quantity of branched-chain aldehyde, ester or ketone required to effect the desired improvement in the anti-detonation characteristics of hydrocarbon motor fuels depends upon the degree of improvement required, the source or character of the hydrocarbon fuel to be improved, and the nature or structure of the compound employed. In general, in a given motor fuel the anti-knock or octane rating is proportional to (1) the quantity of the particular aldehyde, ester or ketone added and, (2) the original anti-knock or octane rating of the fuel. The lower the original anti-knock rating of the fuel, the greater will be the relative increase for the addition of a given quantity of the branched-chain compound. Furthermore, the quantity of aldehyde, ester or ketone required to effect the desired improvement in anti-knock rating is dependent, to a certain extent, upon the structure of the compound. The more "centralized" or compact the structure of the molecule, the less will be required to produce the desired improvement. For example, aldehydes, esters or ketones containing tertiary alkyl groups are generally more efficient addition agents than compounds containing secondary or isoalkyl groups, i. e., less tertiary butyl ethyl ketone is required to bring a given hydrocarbon motor fuel to a given anti-knock rating, than is required when di-iso-propyl ketone is employed.

My invention may be further illustrated by the following examples, wherein the anti-knock values or octane numbers tabulated were determined in accordance with the A. S. T. M.-C. F. R. Method D 357-34T.

| Base fuel | Volume, percent | Anti-knock agent | Volume, percent | Octane number |
|---|---|---|---|---|
| Pennsylvania straight-run gasoline | 100 | | 0 | 41 |
| Do | 75 | Isobutyraldehyde | 25 | 68 |
| Do | 90 | Isopropyl formate | 10 | 48 |
| Do | 75 | ----do---- | 25 | 57 |
| Do | 90 | Secondary butyl acetate | 10 | 49 |
| Do | 90 | Tertiary butyl acetate | 10 | 48 |
| Do | 75 | ----do---- | 25 | 59 |
| Do | 75 | Secondary amyl acetate | 25 | 60 |
| Do | 90 | Methyl isobutyl ketone | 10 | 49 |
| Do | 75 | ----do---- | 25 | 59 |
| Do | 90 | Methyl isopropyl ketone | 10 | 48 |
| Do | 75 | Methyl tertiary butyl ketone | 25 | 59 |
| Do | 90 | Mesityl oxide | 10 | 51 |

It will be seen from the above examples that the addition of various branched-chain aldehydes, esters and ketones to hydrocarbon motor fuel produces a marked improvement in the anti-knock value or octane number thereof.

In another aspect of my invention, the addition of said branched chain compounds to hydrocarbon motor fuels improves, to a marked extent, the blending qualities thereof with organo-metallic compounds such as tetraethyl lead.

I have found that branched-chained aldehydes, esters and ketones are decidedly more effective as addition agents for improving the blending qualities of motor fuels than is iso-octane which has been employed heretofore as an addition agent for aviation fuels. A branched-chain aldehyde such as isobutyraldehyde, when added to a hydrocarbon motor fuel permits the use of approximately 25% to 30% less tetraethyl lead to produce a blended fuel of a desired octane number, than does iso-octane in quantities corresponding to the quantities of aldehyde used. Branched-chain aldehydes, esters and ketones other than isobutyraldehyde behave similarly in improving both the blending qualities and anti-knock rating of motor fuels.

While herein I have particularly described the use of branched-chain aldehydes, esters and ketones, per se, as motor fuels, and as addition agents for hydrocarbon motor fuels, I do not intend to limit myself thereto but may employ such branched-chain compounds as addition agents for various types of motor fuels, including mixtures of petroleum hydrocarbons such as gasoline with alcohol or benzol; fuels produced by the cracking and polymerization of hydrocarbon oils and gases; fuels produced by the decomposition and/or hydrogenation of carbonaceous substances; and fuels produced by the chemical polymerization of unsaturated hydrocarbons. Furthermore, I may employ one or a mixture of branched-chain aldehydes, esters and ketones, and particularly those having boiling points within the motor fuel boiling range or below about 200° C., as fuels or as addition agents for motor fuels. Such oxygenated organic compounds contain at least one aldehyde, ester or ketone group, and at least one branched-chain aliphatic hydrocarbon group, all of said compounds being characterized by the

structure.

What I claim is:

A fuel for internal combustion engines comprising a hydrocarbon mixture of the motor fuel boiling range and a quantity of isobutyraldehyde sufficient to substantially increase the anti-knock value thereof.

DAVID LIPKIN.